United States Patent
Choi et al.

(10) Patent No.: US 10,690,582 B2
(45) Date of Patent: Jun. 23, 2020

(54) APPARATUS AND METHOD FOR SENSING BIOMOLECULES WHICH ALLOWS RESTORATION OF SENSING OFFSET

(71) Applicant: KOREA INSTITUTE OF SCIENCE AND TECHNOLOGY, Seoul (KR)

(72) Inventors: Jaebin Choi, Seoul (KR); Chulki Kim, Seoul (KR); Sang Kyung Kim, Seoul (KR); Seok Lee, Seoul (KR); Chaehyun Lim, Seoul (KR); Jae Hun Kim, Seoul (KR); Taikjin Lee, Seoul (KR); Minah Seo, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 146 days.

(21) Appl. No.: 15/698,646

(22) Filed: Sep. 8, 2017

(65) Prior Publication Data

US 2018/0073972 A1 Mar. 15, 2018

(30) Foreign Application Priority Data

Sep. 9, 2016 (KR) .......................... 10-2016-0116165

(51) Int. Cl.
*G01N 15/10* (2006.01)
*G01N 35/08* (2006.01)
(Continued)

(52) U.S. Cl.
CPC ..... *G01N 15/1012* (2013.01); *G01N 15/0272* (2013.01); *G01N 15/0656* (2013.01);
(Continued)

(58) Field of Classification Search
CPC ................... G01N 15/0272; G01N 2015/0065
See application file for complete search history.

(56) References Cited

U.S. PATENT DOCUMENTS

| 5,965,456 A | 10/1999 | Malmqvist et al. |
| 2002/0076825 A1* | 6/2002 | Cheng ............... B01L 3/502761 436/174 |

(Continued)

FOREIGN PATENT DOCUMENTS

| JP | 882581 A | 3/1996 |
| KR | 1020040013731 A | 2/2004 |

(Continued)

OTHER PUBLICATIONS

Xu et al., "Electrophoretic and field-effect graphene for all-electrical DNA array technology", Nature Communications, Sep. 5, 2014, pp. 1-9, vol. 5, Macmillan Publishers Limited.

*Primary Examiner* — Sadie White
(74) *Attorney, Agent, or Firm* — Cantor Colburn LLP

(57) ABSTRACT

An apparatus for sensing biomolecules includes: a storage in which a solution containing a target material is received; a sensor configured to sense the target material; and a flow controller connected between the storage and the sensor to supply the solution to the sensor, wherein the flow controller controls a solution flow to supply the solution containing the target material and the solution containing no target material in an alternating manner. According to the apparatus for sensing biomolecules, the sensing device always achieves a sensing offset, and consequently, long-term continuous measurement is enabled, leading to the maximized usage efficiency of the sensor, and the value of quantitative measurement can be obtained with high precision.

6 Claims, 5 Drawing Sheets

(51) Int. Cl.
*G01N 15/02* (2006.01)
*G01N 27/327* (2006.01)
*G01N 15/06* (2006.01)
*G01N 35/10* (2006.01)
G01N 15/00 (2006.01)

(52) U.S. Cl.
CPC ........... *G01N 27/327* (2013.01); *G01N 35/08* (2013.01); *G01N 35/1095* (2013.01); *G01N 2015/0038* (2013.01); *G01N 2015/0053* (2013.01); *G01N 2015/0065* (2013.01); *G01N 2015/1006* (2013.01); *G01N 2015/1081* (2013.01); *G01N 2015/1087* (2013.01)

(56) References Cited

U.S. PATENT DOCUMENTS

| | | |
|---|---|---|
| 2004/0028566 A1 | 2/2004 | Ko et al. |
| 2010/0143194 A1 | 6/2010 | Lee et al. |
| 2013/0190212 A1* | 7/2013 | Handique ......... B01L 3/502715 506/37 |
| 2013/0248380 A1 | 9/2013 | Cui |
| 2014/0017124 A1 | 1/2014 | Lee et al. |

FOREIGN PATENT DOCUMENTS

| | | |
|---|---|---|
| KR | 1020100065032 A | 6/2010 |
| KR | 1020100066278 A | 6/2010 |
| KR | 1020110108175 A | 10/2011 |
| KR | 1020130121464 A | 11/2013 |
| KR | 1020140010506 A | 1/2014 |
| KR | 101440542 B1 | 9/2014 |
| KR | 1020150117945 A | 10/2015 |
| KR | 101569249 B1 | 11/2015 |

* cited by examiner

APPARATUS AND METHOD FOR SENSING BIOMOLECULES WHICH ALLOWS RESTORATION OF SENSING OFFSET

CROSS-REFERENCE TO RELATED APPLICATION

This application claims priority to Korean Patent Application No. 10-2016-0116165, filed on Sep. 9, 2016, and all the benefits accruing therefrom under 35 U.S.C. § 119, the contents of which in its entirety are herein incorporated by reference.

BACKGROUND

1. Field

Exemplary embodiments relate to an apparatus and method for sensing biomolecules, and more particularly, to an apparatus and method for sensing biomolecules which always achieves a sensing offset of a sensing device through flow control of a target material supplied to the sensing device.

2. Description of the Related Art

With the increasing interest in environment and demand for technology in recent years, studies are being made on an apparatus and method for quantitative and qualitative analysis of biomolecular materials in a fluid. For example, attention is paid to a sensor device that senses biomolecules by an electrochemical method using a graphene electrode to which a target biomolecular material binds. Besides, there are various electrical or optical sensors such as an electrochemical-type sensor using a gold (Au) electrode, an optical-type sensor using fluorescence absorbance and emission, or a sensor using antigen-antibody reaction or aptamer.

However, the conventional biomolecular sensor has a problem with a time-domain drift phenomenon in which a reaction offset of the sensor rises with the increasing time during which the sensor is exposed to a target material. FIG. 1 is a graph showing a time-domain drift phenomenon. Referring to FIG. 1, theoretically a sensor signal will have to increase or decrease in the presence or absence of a target material as shown in a graph 100. However, in reality, the reaction offset increases over time, and the signal generally increases in size irrespective of whether a target material is present or absent, so the sensor signal shows the pattern such as those shown in a graph 101 or 102. Due to this, the problem of the conventional sensor is that it impossible to continuously measure and reliability of the value of quantitative measurement is low.

RELATED LITERATURES

Patent Literature (Patent Literature 1) US Patent Publication No. 2013/0248380

SUMMARY

According to an aspect of the present disclosure, there is provided an apparatus and method for sensing biomolecules which always achieves an offset of a sensing device for sensing a target biomolecular material to allow long-term measurement and maximized usage efficiency of the sensing device.

An apparatus for sensing biomolecules according to an embodiment includes: a storage in which a solution containing a target material is received; a sensor configured to sense the target material; and a flow controller connected between the storage and the sensor to supply the solution to the sensor, wherein the flow controller controls a solution flow to supply the solution containing the target material and the solution containing no target material in an alternating manner.

In an embodiment, the flow controller may include: a first valve installed on a first flow path connecting the storage and the sensor, wherein the first valve is opened and closed to control a flow of the solution containing the target material; a filter installed on a second flow path connecting the storage and the sensor; and a second valve installed between the filter of the second flow path and the sensor, wherein the second valve is opened and closed to control a flow of the solution from which the target material is removed by the filter.

In an embodiment, the flow controller may be configured to open the first valve and the second valve in an alternating manner at a preset time interval. The preset time interval may be, for example, 5 to 20 minutes.

In an embodiment, the filter may include a filtration device configured to filter the target material based on particle size and/or an adsorption device to which the target material specifically binds.

A method for sensing biomolecules according to an embodiment includes: injecting a solution containing a target material into a storage; and supplying the solution containing the target material and the solution containing no target material to a sensor in an alternating manner, by controlling a fluid flow from the storage to the sensor.

In an embodiment, the supplying of the solution containing the target material and the solution containing no target material in an alternating manner may include: opening a first valve installed on a first flow path between the storage and the sensor; and opening a second valve installed on a second flow path between the storage and the sensor with the first valve closed, wherein the second flow path is different from the first flow path and a filter is installed on the second flow path to filter the target material.

In an embodiment, the opening of the first valve and the opening of the second valve may be iteratively performed in an alternating manner at a preset time interval. The preset time interval may be, for example, 5 to 20 minutes.

According to the apparatus and method for sensing biomolecules in accordance with to an aspect of the present disclosure, a sensing device always achieves a sensing offset by injecting a solution containing a target material and a solution from which a target material is removed by filtration or adsorption into the sensing device in an alternating manner. Consequently, long-term continuous measurement is enabled, leading to the maximized usage efficiency of the sensor, and the value of quantitative measurement can be obtained with high precision.

The apparatus and method for sensing biomolecules in accordance with an aspect of the present disclosure can be used in systems for providing samples stably and periodically, allowing a wide range of applications irrespective of the sensing principle, such as electrochemical sensors and optical sensors, and particularly, can be immediately applied in the field of existing quantitative polymerase chain reaction (qPCR) technology or real-time bio-signal monitoring.

DETAILED DESCRIPTION

Figure 1:
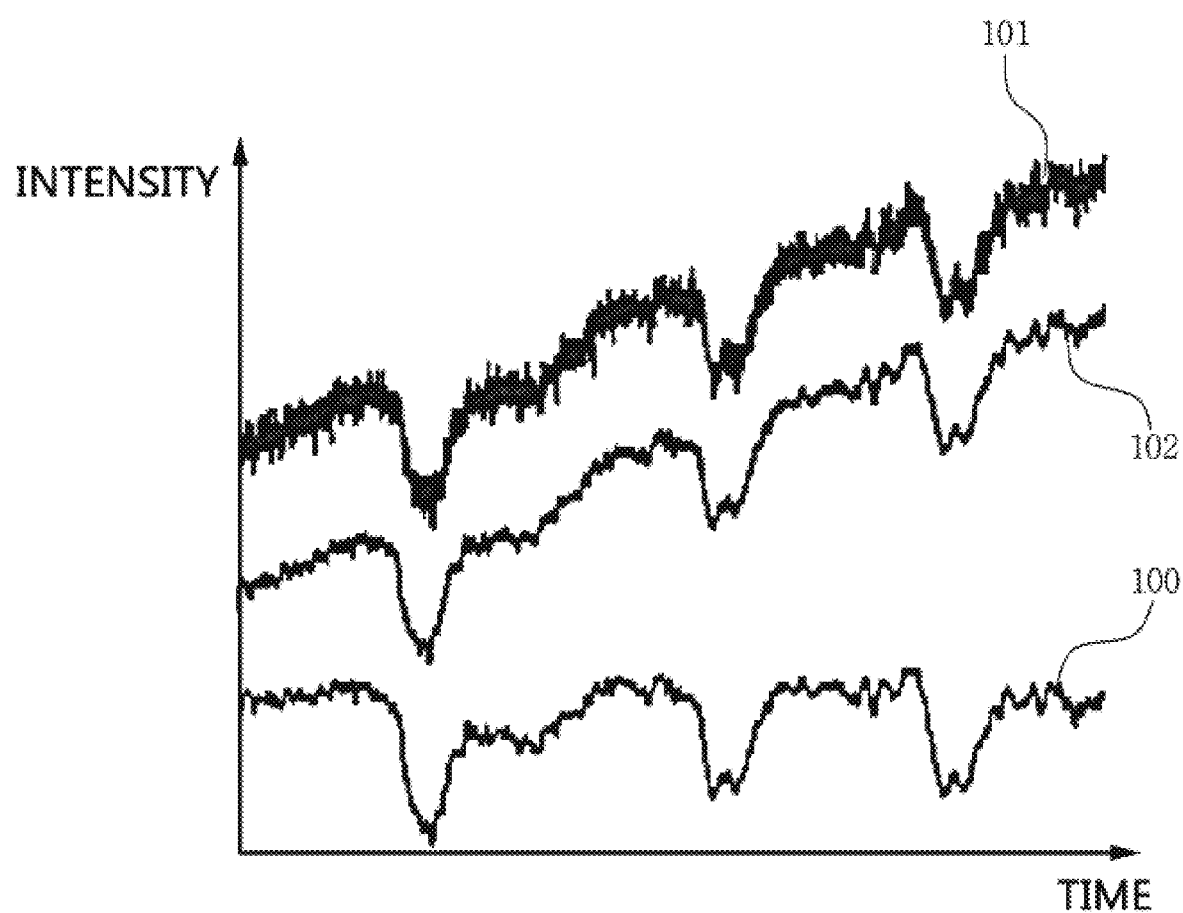
FIG. 1 is a graph showing a time-domain drift phenomenon in a conventional biomolecular sensor.

Hereinafter, embodiments of the present disclosure are described in detail with reference to the accompanying drawings.

Prior to the description, the terms or words used in the specification and the appended claims should not be construed as limited to general and dictionary meanings, but interpreted based on the meanings and concepts corresponding to the technical spirit of the present disclosure on the basis of the principle that the inventor is allowed to define terms appropriately for the best explanation.

Therefore, the embodiments described in the specification and illustrations shown in the drawings are just some embodiments of the present disclosure and do not fully represent the technical spirit of the present disclosure, and it should be understood that there various equivalent variations and modifications may be made thereto.

Figure 2:
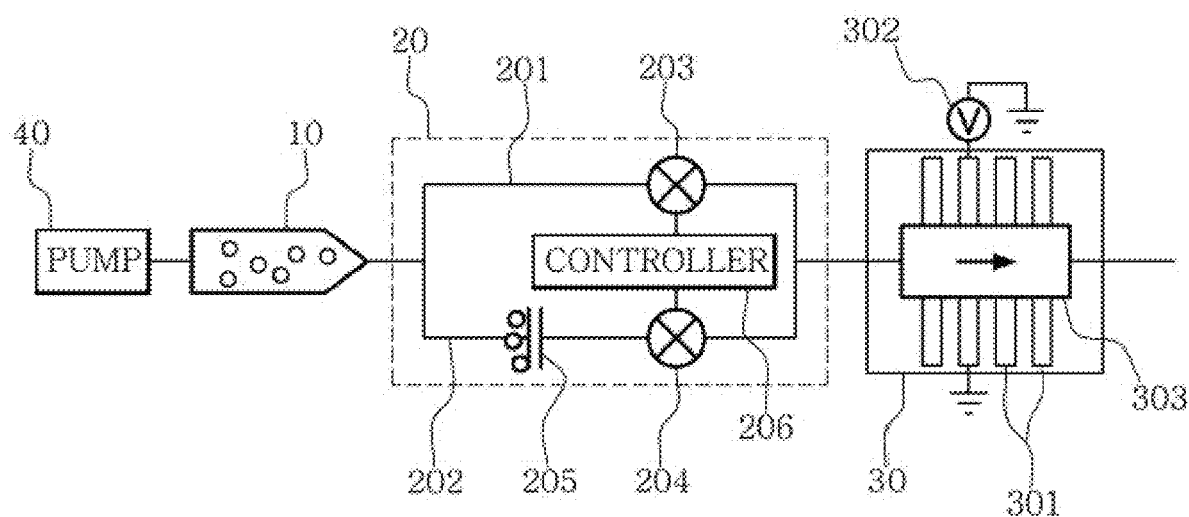
FIG. 2 is a schematic diagram of an apparatus for sensing biomolecules according to an embodiment.

FIG. 2 is a schematic diagram of an apparatus for sensing biomolecules according to an embodiment.

Referring to FIG. 2, the apparatus for sensing biomolecules according to this embodiment includes a storage 10 in which a solution containing a target material is stored, a sensing unit 30 for sensing the target material, and a flow controller 20 for allowing restoration of a sensing offset by controlling a solution flow between the storage 10 and the sensing unit 30. In an embodiment, the apparatus for sensing biomolecules further includes a pump 40 to cause the solution to flow so that the solution from the storage 10 is supplied to the sensing unit 30.

The storage 10 in which the solution containing the target material is received may be a reservoir with a fine structure. The target material in the solution received in the storage 10 may be any biomolecule with a size of nanometer or micrometer level, and is not limited to a particular material.

The flow controller 20 is connected between the storage 10 and the sensing unit 30. In an embodiment, the flow controller 20 includes a first flow path 201 and a second flow path 202 that are different from each other, and first and second valves 203, 204 are respectively installed on the flow paths 201, 202. Furthermore, a filter 205 is installed on the second flow path 202. The filter 205 is a device for removing the target material in the solution, and for example, may include a filtration device which filters the target material by filtering off particles larger than a particular size based on the particle size, or an adsorption device which removes the target material from the solution due to specific binding of the target material.

The flow controller 20 allows the solution supplied from the storage 10 to the sensing unit 30 to be supplied through any one of the first flow path 201 and the second flow path 202 by opening and closing the first and second valves 203, 204 in an alternating manner. When the first valve 203 is opened and the second valve 204 is closed, the solution is supplied through the first flow path 201, and thus, the target material in the solution is transmitted to the sensing unit 30 without any resistance. On the other hand, when the second valve 204 is opened and the first valve 203 is closed, the solution is supplied through the second flow path 202 and the solution from which the target material is removed by the filter 205 installed on the second flow path 202 is supplied to the sensing unit 30.

In case that the solution containing the target material and the solution containing no target material are supplied to the sensing unit 30 in an alternating manner, the sensing offset of the sensing unit 30 may be restored by way of cleaning over a time interval during which the solution containing no target material is supplied to the sensing unit 30. To this end, the flow controller 20 may open and close the first valve 203 and the second valve 204 in an alternating manner at a time interval of about 5 to 20 minutes that is optimal for bonds between molecules.

In an embodiment, the flow controller 20 includes a controller 206 for regulating the opening and closing of the first and second valves 203, 204. The controller 206 includes a timing controller, and may close the opened valve 203, 204 or open the closed valve 203, 204 by inputting a defined mechanical and/or electrical signal to each valve 203, 204 in each cycle of the timing controller.

The sensing unit 30 is a sensor which detects the target material in the solution while the solution is flowing. For example, the sensing unit 30 may include an electrode 301 made of graphene, a power source 302 for applying voltage to the electrode 301, and a reaction chamber 303 which exposes the target material to the electrode 301 so that the target material is adsorbed to the surface of the heated graphene electrode 301. However, this is provided for illustration, and the sensing unit 30 may be any electrical and/or optical device for detecting biomolecules, for example, a sensor using an electrode made of gold (Au) or an optical sensor using fluorescence absorbance and emission, and is not limited to a particular type.

Figure 3:
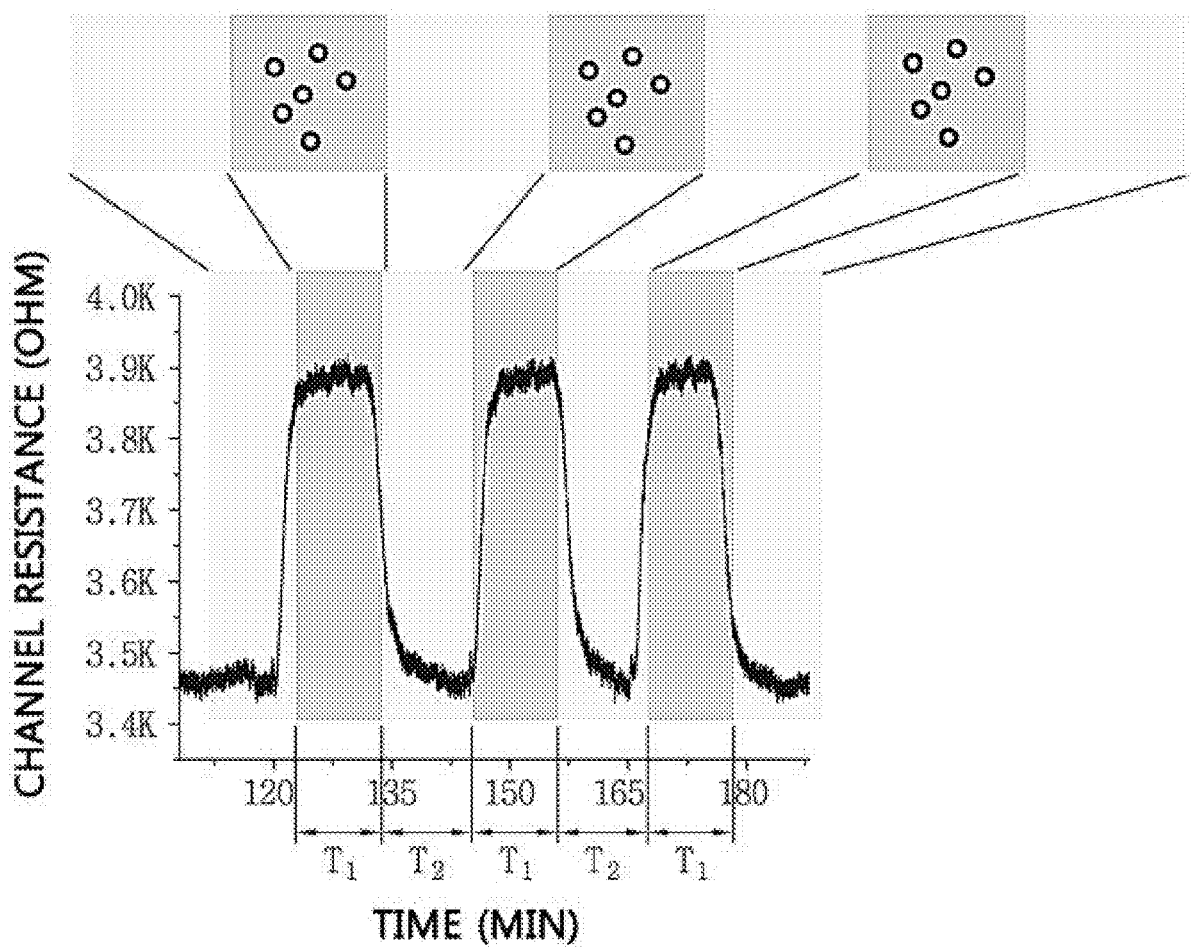
FIG. 3 is a graph showing the channel resistance measured by an apparatus for sensing biomolecules according to an embodiment.

FIG. 3 is a graph showing the channel resistance measured by the apparatus for sensing biomolecules according to an embodiment.

FIG. 3 shows the channel resistance measured by the sensing unit while supplying the target material to the channel of the sensing unit, in which a first time interval $T_1$ denotes a time interval during which the solution containing the target material is supplied to the sensing unit, and a second time interval $T_2$ denotes a time interval during which the solution containing no target material is supplied to the sensing unit. As shown in the drawing, it can be seen that the sensing offset does not change while the first and second time intervals $T_1$, $T_2$ are repeated in an alternating manner multiple times, and the channel resistance simply increases or decreases depending on whether the target material is present or absent.

Figure 4:
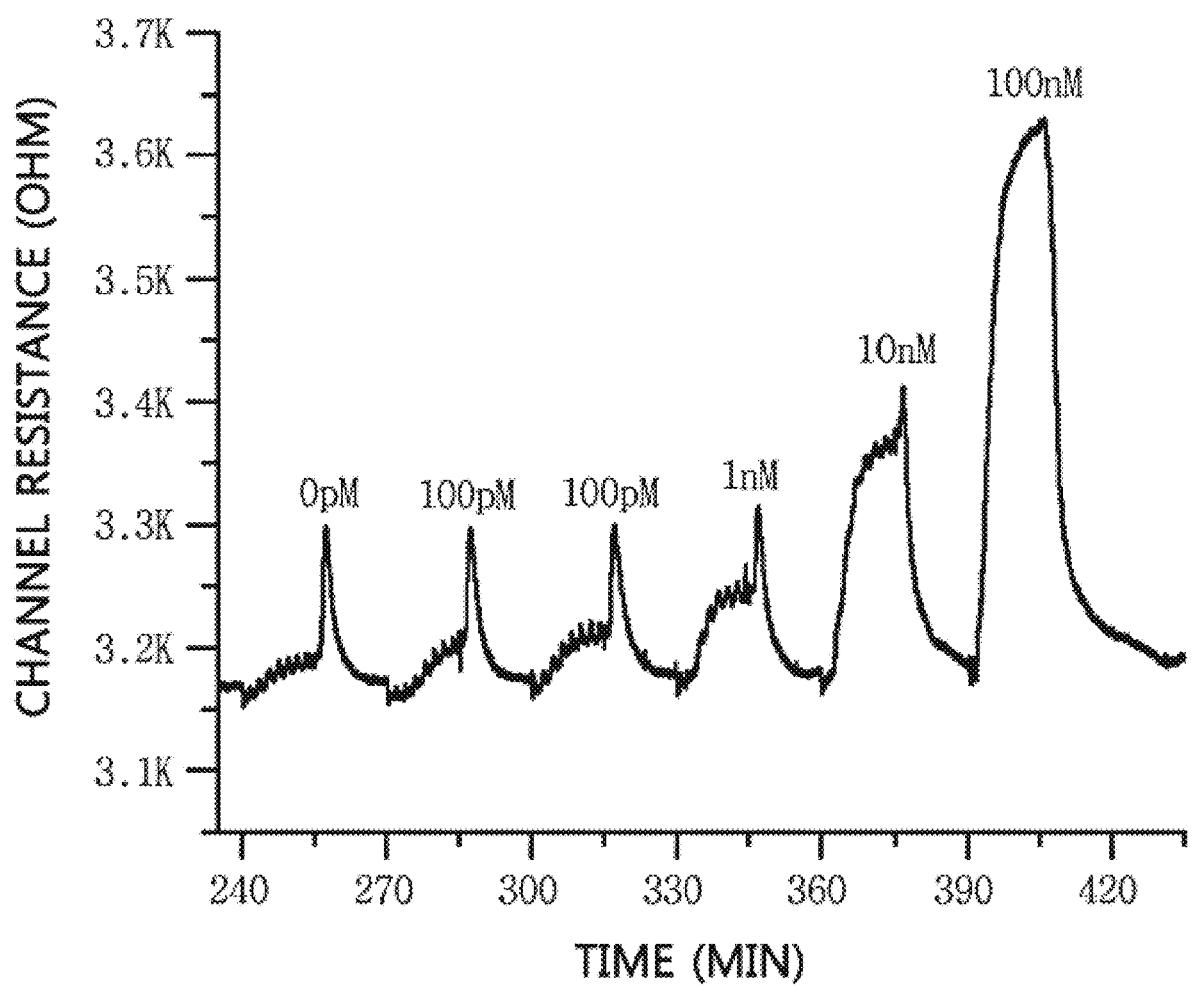
FIG. 4 is another graph showing the channel resistance measured by an apparatus for sensing biomolecules according to an embodiment.

FIG. 4 is another graph showing the channel resistance measured by the apparatus for sensing biomolecules according to an embodiment, depicting the channel resistance measured with the increasing concentration of thrombin supplied to the channel of the sensing unit from 0 pM to 100 nM.

The conventional sensor for sensing biomolecules increases in sensor measurement value over time because the sensing offset is not restored, and thus, it is possible to continuously measure only at a higher concentration of biomolecules to measure in a next measurement cycle than a previous cycle, i.e., at increasing concentrations. Due to this, after measurements are carried out a few cycles, the offset of sensor measurement values excessively increases, resulting in a loss of a sensing reference point, which makes quantitation impossible.

In contrast, in the case of the apparatus for sensing biomolecules according to this embodiment, as shown in FIG. 4, even though the concentration of biomolecules changes, the offset can be restored with no great change in channel resistance value over a time interval during which biomolecules are not detected.

Accordingly, using the apparatus for sensing biomolecules according to this embodiment, it is possible to continuously measure at a lower concentration of biomolecules to measure in a next measurement cycle than a previous cycle, i.e., at decreasing concentrations. In addition, in the case of a solution containing two or more types of different target materials, stable measurement is also possible without a loss of a sensing reference point.

Accordingly, the benefit of using the apparatus for sensing biomolecules according to this embodiment is that as measurement values change, quantitation of the target material can be achieved with higher precision than the conventional sensor based on offset restoration following each measurement cycle.

Figure 5:
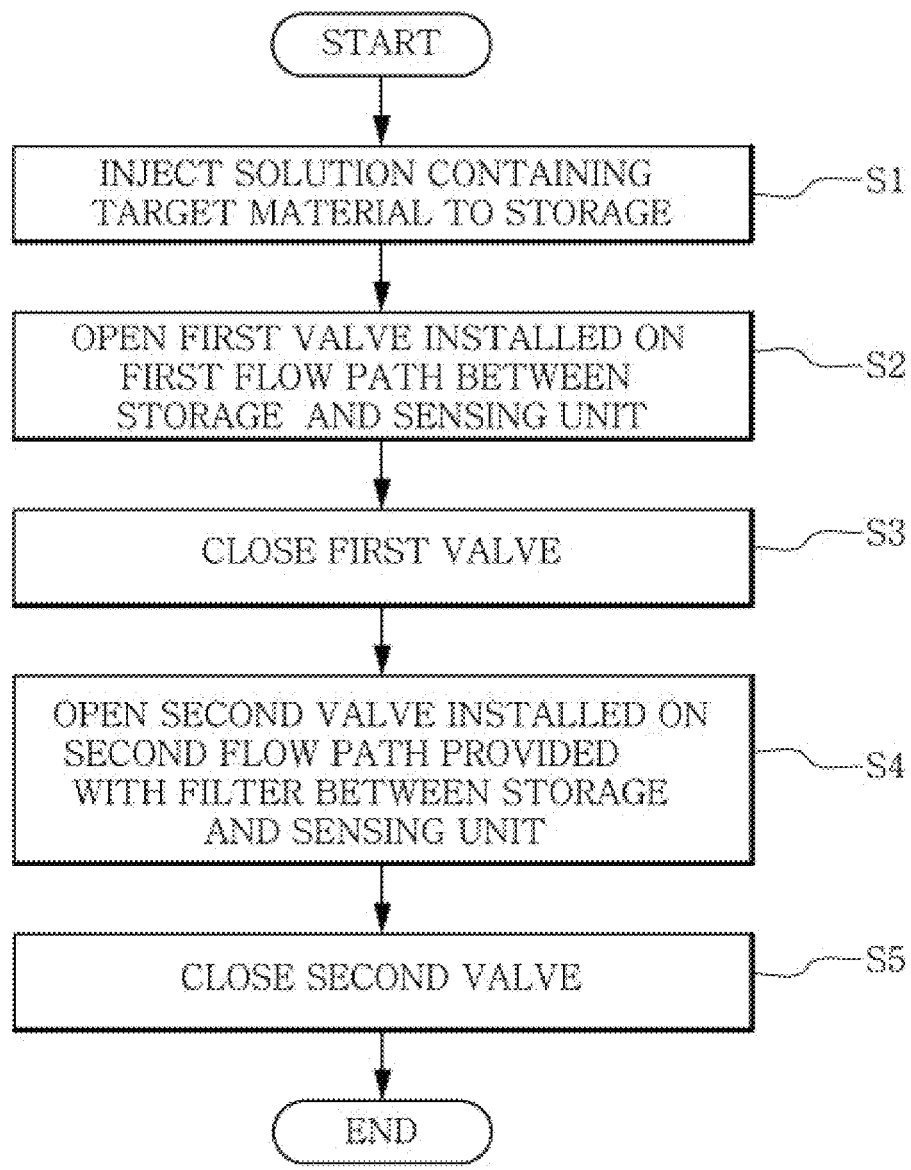
FIG. 5 is a flowchart of a method for sensing biomolecules according to an embodiment.

FIG. 5 is a flowchart of a method for sensing biomolecules according to an embodiment. For convenience of description, each step of the method for sensing biomolecules according to this embodiment is described with reference to FIGS. 1 and 5.

First, a solution containing a target material may be injected into the storage 10 (51). The target material may be mixed in a fluid, which then may be delivered, and the target material may be any biomolecule that can be detected using the sensor of the sensing unit 30, and is not limited to a particular material.

Subsequently, the flow controller 20 may open the first valve 203 installed on the first flow path 201 between the storage 10 and the sensing unit 30 (S2). In this instance, the second valve 204 installed on the second flow path 202 between the storage 10 and the sensing unit 30 is closed. Consequently, the solution containing the target material is supplied to the sensing unit 30 through the first flow path 201, forming a measurement cycle. The measurement cycle may have an interval of about 5 to 20 minutes, but is not limited thereto.

When one measurement cycle is completed, the flow controller 20 closes the first valve 203 (S3), and opens the second valve 204 installed on the second flow path 202 between the storage 10 and the sensing unit 30 (S4). As the filter 205 is installed on the second flow path 202, the target material in the solution is filtered off by the filter 205 and only the solution containing no target material is supplied to the sensing unit 30. Through this, the sensing offset restoration of the sensing unit 30 is accomplished. Similar to the measurement cycle, a time interval for sensing offset restoration may be about 5 to 20 minutes, but is not limited thereto.

Subsequently, the flow controller 20 closes the second valve 204 (S5), and opens the first valve 203 again to carry out a next measurement cycle (S2). The fluid flow control step (S2 to S5) may be iteratively performed the number of times required to sense the target material.

While the present disclosure has been hereinabove described with reference to the embodiments shown in the drawings, this is provided for illustration purpose only and those skilled in the art will understand that various modifications and variations can be made thereto. However, it should be noted that such modifications fall within the scope of technical protection of the present disclosure. Therefore, the true scope of technical protection of the present disclosure shall be defined by the technical spirit of the appended claims.

What is claimed is:

1. An apparatus for sensing biomolecules, comprising:
   a storage in which a solution containing a target material is received;
   a sensor configured to sense the target material; and
   a flow controller comprising:
      a first flow path connecting the storage and the sensor;
      a second flow path connecting the storage and the sensor;
      a filter installed on the second flow path and not on the first flow path, the filter filtering out the target material,
      wherein the flow controller controls a solution flow to supply the solution containing the target material through the first flow path and a solution containing no target material through the second flow path to the sensor in an alternating manner, and
      the first flow path and the second flow path are connected to each other into a single path extending to the sensor.

2. The apparatus for sensing biomolecules according to claim 1, wherein the flow controller further comprises:
   a first valve installed on the first flow path, wherein the first valve is opened and closed to control a flow of the solution containing the target material received from the storage; and
   a second valve installed between the filter of the second flow path and the sensor, wherein the second valve is opened and closed to control a flow of the solution containing no target material.

3. The apparatus for sensing biomolecules according to claim 2, wherein the flow controller is configured to open the first valve and the second valve in an alternating manner at a preset time interval.

4. The apparatus for sensing biomolecules according to claim 3, wherein the preset time interval comprises 5 to 20 minutes.

5. The apparatus for sensing biomolecules according to claim 2, wherein the filter includes a filtration device configured to filter out the target material based on particle size.

6. The apparatus for sensing biomolecules according to claim 2, wherein the filter includes an adsorption device to which the target material specifically binds and which prevents the target material from passing through the filter.

* * * * *